United States Patent Office 2,908,720
Patented Oct. 13, 1959

2,908,720
ALKYL-TRIHYDROXY-TETRAHYDRONAPHTHYL-ETHYLENE GLYCOLS

Carl B. Linn, Riverside, Ill., assignor, by mesne assignments, to Universal Oil Products Company, Des Plaines, Ill., a corporation of Delaware No Drawing. Application November 10, 1955
Serial No. 546,270

3 Claims. (Cl. 260—618)

This application is a continuation-in-part of my copending application Serial No. 360,838, filed June 10, 1953, now Patent 2,798,098, July 2, 1957, as a continuation of my application Serial No. 212,839, filed February 26, 1951, now abandoned.

This invention relates generally to a new class of organic chemical compounds, the alkyl-trihydroxy-tetrahydronaphthyl-ethylene glycols. These new organic chemical compounds are more particularly defined as alkyl substituted - 2,3,4 - trihydroxy - 1,2,3,4 - tetrahydro-1-naphthyl-ethylene glycol.

Still more particularly, the invention relates to (7 - methyl - 2,3,4 - trihydroxy - 1,2,3,4 - tetrahydro - 1-naphthalene)-ethylene glycol, to its preparation, and to its use as a gelling agent for nonaromatic solvents containing free hydroxyl groups.

Besides being useful as gelling agents for nonaromatic solvents containing free hydroxyl groups, the alkyl-trihydroxy-tetrahydronaphthyl-ethylene glycols are also useful as intermediates in organic synthesis such as in the production of detergents, wetting agents, and the like.

An object of this invention is to provide novel condensation products of aldohexoses and their polymers with alkylaromatic hydrocarbons which are adapted for use as gelling agents for water, alcohols, etc., and also for use as intermediates in the production of detergents and wetting agents.

One embodiment of this invention is a composition of matter comprising an alkyl substituted-trihydroxy-tetrahydronaphthyl-ethylene glycol.

Another embodiment of this invention is a composition of matter comprising an alkyl substituted-trihydroxy-tetrahydro-1-naphthyl-ethylene glycol.

A further embodiment of this invention is a composition of matter comprising an alkyl-2,3,4-trihydroxy-1,2,3,4-tetrahydro-1-naphthyl-ethylene glycol.

A still further embodiment of this invention is a composition of matter comprising (7-methyl-2,3,4-trihydroxy-1,2,3,4-tetrahydro-1-naphthalene)-ethylene glycol.

I have found that alkyl-trihydroxy-tetrahydronaphthyl-ethylene glycols, and particularly (7-methyl-2,3,4-trihydroxy - 1,2,3,4 - tetrahydro - 1 - naphthalene) - ethylene glycol, are useful as gelling agents for nonaromatic solvents containing a free hydroxyl group. That is, these new compositions of matter act as gelling agents for water and for alcohols, particularly lower molecular weight alcohols. Gelled lower molecular weight alcohols are useful as solid or canned fuels.

These alkyl - trihydroxy - tetrahydronaphthyl - ethylene glycols are produced by reacting an alkylaromatic hydrocarbon, for example, toluene, o-xylene, p-xylene, etc. with an aldohexose such as glucose, mannose, galactose, trehalose, cellulose, starch, etc., in the presence of strong hydrofluoric acid, generally from about 85 to 100% hydrogen fluoride concentration, at a temperature of from about 0° to about 100° C. or higher for a time sufficient to effect condensation, sometimes being from about 1 hour or less to about 70 hours or more.

Althouugh strong hydrofluoric acid is generally the catalyst preferred for use in producing my alkyl-trihydroxy-tetrahydronaphthyl-ethylene glycols, certain modified Friedel-Crafts type catalysts are also useful for this purpose. Highly active Friedel-Crafts catalysts such as substantially anhydrous aluminum chloride, sometimes have a cracking action on the long chain alkyl groups of certain alkylaromatic hydrocarbon starting materials and accordingly they are generally less desirable than modified Friedel-Crafts metal halides such as aluminum chloride modified by the addition thereto of an alcohol, ether, ester, a nitroparaffin, and the like to produce a modified catalyst with a controlled activity. Such catalysts are generally utilized at temperatures ranging from about 30° to about 100° C. and preferably at from about 50° to about 100° C.

The alkylaromatic hydrocarbon generally may be reacted with aldohexoses and their polymers as hereinabove set forth, subject to the limitation that the alkylaromatic hydrocarbon contains adjacent unsubstituted carbon atoms, or stated in another way, the alkylaromatic hydrocarbon must contain two carbon atoms in ortho position to one another, these two carbon atoms being bonded solely to other carbon atoms and to hydrogen. Suitable aromatic hydrocarbons include benzene, ethyl benzene, n-propylbenzene, isopropylbenzene, n-butyl benzene, isobutylbenzene, sec-butylbenzene, tert-butylbenzene, amylbenzene (including its isomeric forms), and higher molecular weight monoalkylated aromatic hydrocarbons including those sometimes referred to in the art as alkylate as, for example, hexylbenzene, nonylbenzene, dodecylbenzene, etc. Dialkylated aromatic hydrocarbons utilizable as starting materials in the process of this invention include o-xylene, m-xylene, p-xylene, o-ethyl toluene, m-ethyl toluene, p-ethyl toluene, etc., and higher molecular weight dialkylaromatic hydrocarbons sometimes referred to in the art as alkylate including hexyl toluene, nonyl toluene, dodecyltoluene, pentadecyl toluene, etc. Polyalkylated aromatic hydrocarbons utilizable as starting materials include 1,2,3-dimethylbenzene, 1,2,4 - trimethylbenzene, 1,2,3,4 - trimethylbenzene, etc. Other suitable utilizable aromatic hydrocarbons include those with two or more aryl groups such as diphenyl, diphenylmethane, triphenylmethane, fluorene, stilbene, etc., as well as aromatic hydrocarbons which contain condensed benzene rings including naphthalene, anthracene, phenanthrene, naphthacene, rubrene, etc.

Carbohydrates which are condensed with the alkyl-aromatic hydrocarbons to form the compositions of this invention include aldohexoses and their di- tri- and polyforms. Simple aldohexoses include mannose, glucose, idose, gulose, galactose, talose, allose, and altrose. Utilizable aldohexose disaccharides include turanose, maltose, lactose, and trehalose. Various polysaccharides which yield aldohexose units during the reaction are also utilizable in the process of the present invention. Such polysaccharides include starch, cellulose, dextran, etc.

The hydrogen fluoride catalyst which is used in producing the compositions of this invention is preferably used in anhydrous form, although it may sometimes be diluted with water to make hydrofluoric acid of the desired concentration. The hydrofluoric acid may also be diluted further with various inert diluents when it is desired to operate the process with low hydrogen fluoride concentration. Suitable inert diluents include n-paraffinic hydrocarbons such as propane, n-butane, n-pentane, n-hexane, etc., and perfluoro derivatives of n-paraffinic hydrocarbons such as perfluoropropane, perfluoro-n-butane, perfluoro-n-pentane, perfluoro-n-hexane, etc. Other suitable diluents in these classes are apparent to one skilled in the art. For example, cycloparaffins such as cyclopentane and cyclohexane may be used.

The condensation reaction may be carried out by slowly adding hydrogen fluoride catalyst to a stirred mixture of the alkylaromatic hydrocarbon and aldohexose or, reversely, by adding the mixture of alkylaromatic hydrocarbon and aldohexose with stirring to a hydrogen fluoride catalyst while maintaining the reaction temperature at from about 0° to about 100° C. by using suitable cooling and/or mixing means. It is often advisable or desirable to commingle the reactants and catalyst at a relatively low temperature such as from about −80° to about −30° C. and then to permit the reaction mixture to warm gradually while the reactants and catalyst are stirred by suitable means such as a motor-driven stirrer or other adequate mixing equipment. After the reaction has reached the desired stage of completion, the hydrogen fluoride may be removed from the reaction mixture by distillation at atmospheric or lower pressure or by passing an inert gas through the reaction mixture while maintaining it at a relatively low temperature. Also, the entire reaction mixture and catalyst may be mixed with water or may be added to ice in order to quench the activity of the hydrogen fluoride catalyst and to permit separation of the organic reaction product and unreacted starting materials from the catalyst. The organic reaction products may also be separated from aqueous hydrogen fluoride by means of an organic solvent in which some of the organic material may be dissolved.

The production of my alkyl-trihydroxy-tetrahydronaphthyl-ethylene glycols may also be carried out continuously by charging the alkylaromatic hydrocarbon, aldohexose, and catalyst continuously to an autoclave equipped with a stirrer or some other suitable mixing equipment, from which the reaction product can be discharged continuously to suitable separating equipment. Thus, for example, when employing substantially anhydrous hydrogen fluoride as the catalyst, the hydrogen fluoride, alkylaromatic hydrocarbon, and aldohexose are charged to a tubular reactor surrounded by a cooling and/or heating means in which mixing of the reactants and catalyst occurs. The reactor may discharge into a flash chamber, from which the hydrogen fluoride catalyst is separated from reaction products and unconverted starting materials. The recovered hydrogen fluoride catalyst is then recycled to further use in the process. The reaction products are also separated by suitable means from unconverted starting materials, and the latter may then be subjected to further conversion in the process.

The alkyl-trihydroxy-tetrahydronaphthyl-ethylene glycols of the present invention may be represented by the following formula:

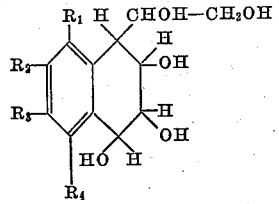

in which $R_1$, $R_2$, $R_3$, and $R_4$ may be independently selected from hydrogen, and alkyl groups such as methyl, ethyl, propyl, isopropyl, n-butyl, isobutyl, sec-butyl, tert-butyl, amyl, hexyl, heptyl, octyl, nonyl, decyl, etc. For example, when $R_1$, $R_3$, and $R_4$ are hydrogen and $R_2$ is methyl, the compound is the preferred embodiment of the present invention, namely, (7-methyl-2,3,4-trihydroxy-1,2,3,4-tetrahydro-1-naphthalene)-ethylene glycol. By varying $R_1$, $R_2$, $R_3$, and $R_4$ as hereinabove set forth, compounds are produced such as (7-ethyl-2,3,4-trihydroxy-1,2,3,4-tetrahydro-1-naphthalene)-ethylene glycol, (7-n-propyl-2,3,4-trihydroxy - 1,2,3,4 - tetrahydro-1-naphthalene)-ethylene glycol, (7-isopropyl - 2,3,4 - trihydroxy-1,2,3,4-tetrahydro-1-naphthalene)-ethylene glycol, (7-n-butyl-2,3,4-tridroxy - 1,2,3,4 - tetrahydro-1-naphthalene)-ethylene glycol, (6,7-dimethyl - 2,3,4 - trihydroxy-1,2,3,4-tetrahydro-1-naphthalene)-ethylene glycol, (5,6,7-trimethyl-2,3,4-trihydroxy - 1,2,3,4 - tetrahydro-1-naphthalene)-ethylene glycol, (6,7,8-trimethyl - 2,3,4 - trihydroxy-1,2,3,4-tetrahydro-1-naphthalene)-ethylene glycol, (6-methyl-7-ethyl-2,3,4-trihydroxy - 1,2,3,4 - tetrahydro-1-naphthalene)-ethylene glycol, (6,8-dimethyl - 2,3,4 - trihydroxy-1,2,3,4-tetrahydro-1-naphthalene)-ethylene glycol, (5,8-dimethyl-2,3,4-trihydroxy - 1,2,3,4 - tetrahydro-1-naphthalene)-ethylene glycol, (5-ethyl-8-methyl-2,3,4-trihydroxy-1,2,3,4-tetrahydro-1-naphthalene)-ethylene glycol, (5-isopropyl-8-methyl-2,3,4-trihydroxy - 1,2,3,4-tetrahydro-1-naphthalene)-ethylene glycol, and (5-sec-butyl-8-methyl-2,3,4-trihydroxy-1,2,3,4-tetrahydro - 1 - naphthalene)-ethylene glycol.

As set forth hereinabove, these compounds are particularly useful as gelling agents for nonaromatic solvents containing free hydroxyl groups. Such solvents include water, methanol, ethanol, n-propyl alcohol, isopropyl alcohol, n-butyl alcohol, isobutyl alcohol, sec-butyl alcohol, tert-butyl alcohol, amyl alcohol, etc. Of these nonaromatic solvents containing free hydroxyl groups, methanol is preferred. In addition to being preferred, gelled methanol is particularly useful as a solid fuel for producing intense heat for use in rockets, and in cooking equipment, etc.

In preparing these gels, the novel compositions of the present invention and the nonaromatic solvents containing free hydroxyl groups can be mixed at room temperature or higher as is desired. Since the solubility of the alkyl-trihydroxy-tetrahydronaphthyl-ethylene glycols in nonaromatic solvents containing free hydroxyl groups is limited, it is often desirable, and in some cases, necessary to heat the mixture to form a clear solution which on cooling sets to a gel. This heating can be carried out up to temperatures of 200° C. or higher, the limiting temperature of course being the boiling point of the particular nonaromatic solvent containing free hydroxyl groups utilized in forming these gels. The gels formed will range in type from semisolids or stiff gels down to plastic or semi-liquid types.

The process of this invention is illustrated further by the following examples which are incorporated herein for the purpose of illustration and with no intention of unduly limiting the generally broad scope of this invention.

EXAMPLE I

This example illustrates the preparation of (7-methyl-2,3,4-trihydroxy-1,2,3,4-tetrahydro-1-naphthalene) - ethylene glycol by the reaction of toluene with cellulose. Cellulose is a polysaccharide containing glucoside linkages and with all but one of the potential aldehyde groups of the glucose residues involved in these glucoside linkages. This reaction was carried out at 30° C. using a relatively large amount of hydrogen fluoride and a toluene-cellulose mol ratio of greater than 2. The conditions for the reaction in quantities of material used in each are summarized in the following table:

*Table I*

REACTION OF CELLULOSE WITH TOLUENE IN THE PRESENCE OF HYDROGEN FLUORIDE

| Run No. | 1 | 2 |
|---|---|---|
| Conditions of Reaction: | | |
| Temperature, °C | 30 | 30 |
| Contact Time, Hrs | 18 | 4 |
| Reactants: | | |
| Cellulose, Grams | 81 | 81 |
| Toluene, Grams | 130 | 130 |
| Hydrogen Fluoride, Grams | 218 | 188 |
| Mol Ratio, Toluene/Cellulose [1] | 2.82 | 2.82 |

[1] Calculated as $C_6H_{10}O_5$, molecular weight, 162.

The two above experiments were conducted in substantially the same manner.

As an example of the manner of conducting these two experiments, the following detailed description of Run 2 is given: into a 1 liter steel turbomixer autoclave was sealed 81 grams of cellulose and 130 grams of toluene. With stirring, the autoclave was cooled to −50° C. and 188 grams of hydrogen fluoride added. The temperature was allowed to rise to 30° C. during two hours and the stirring continued for an additional two hours at 30–35° C. Then a stream of nitrogen was passed through the reactor at atmospheric temperature for 16 hours. The hydrogen fluoride and toluene volatilized were condensed at −78° C., and the recovery was: hydrogen fluoride, 135 grams; and toluene, 36 grams. A substantial amount of hydrogen fluoride remained behind in reaction mixture, although most of it could have been recovered by prolonging the nitrogen purge. The autoclave was opened and the product found to be a heavy fuming liquid. Water was added to extract the remaining hydrogen fluoride. This aqueous part was neutralized with magnesium oxide and concentrated to yield a water-soluble product which was dissolved in benzene, the benzene solution filtered, and the benzene removed by evaporation. This product was a brown solid and weighed 146 grams. It was separated into an ether-soluble and ether-insoluble portion. From the latter was isolated a pure compound, melting point 214–216° C., which was identified as (7-methyl-2,3,4-trihydroxy-1,2,3,4-tetrahydro-1-naphthalene)-ethylene glycol. This compound is somewhat soluble in hot water, but when the water solutions were cooled, they gelled. The completely dry substance was hygroscopic. The elementary analysis for this compound indicated exactly the empirical formula $C_{13}H_{18}O_5$.

EXAMPLE II

This example illustrates the reaction of toluene with glucose, showing the interchangeability of cellulose and glucose for the preparation of compounds of the present invention. The procedure utilized in this example is similar to that described in detail in Example I. A summary of the results obtained is given in the following table:

Table II
REACTION OF GLUCOSE WITH TOLUENE IN THE PRESENCE OF HF AT 30° C.

Charge: Grams
Glucose_____ 50
Toluene_____ 170
Hydrogen Fluoride_____ 220±15

| Run No. | 3 | 4 | 5 | 6 | 7 | 8 |
|---|---|---|---|---|---|---|
| Contact Time, Hrs. | 0.5 | 1.5 | 3 | 20 | 20 | 66 |
| Water-Soluble @ 25° C., Grams | 31 | 26 | 11 | 30 | 24 | 13 |
| (7-methyl-2, 3, 4-trihydroxy-1, 2, 3, 4 - tetrahydro - 1 - naphthalene) - ethylene glycol, grams | 3 | 2 | 4 | 6 | (a) | (a) | a Present; concentration not determined.

From Table II it will be noted that the reaction product of glucose and of cellulose with toluene is the same. The apparent small yields of desired product can be improved by the improvement of recovery techniques.

The (7-methyl-2,3,4-trihydroxy-1,2,3,4-tetrahydro-1-naphthalene)-ethylene glycol was characterized as follows:

Crystalline form:
    Usually amorphous gel.
    Occasionally needle crystals.
Melting point: 212–215° C.
Empirical formula: $C_{13}H_{18}O_5$
Solubility:
    Water, moderately soluble at 20° C.; sets to clear, stiff gel.
    Ethyl alcohol, soluble cold; sets to plastic-like gel.
    Ethyl acetate, soluble.
    Ethyl ether, insoluble.
    Chromic acid oxidation products: No identifiable organic acid.

The fact that no identifiable organic acid was isolated is typical of a trisubstituted benzene structure, for example, 1,2,4-trimethylbenzene.

EXAMPLE III

Ortho-xylene is reacted with glucose in a manner similar to that described in Example I. From the water-soluble portion of the reaction product is isolated (6,7-dimethyl-2,3,4-trihydroxy-1,2,3,4-tetrahydro-1-naphthalene)-ethylene glycol. This composition also has the property of setting lower aliphatic alcohols into gels.

I claim as my invention:
1. An alkyl substituted-2,3,4-trihydroxy-1,2,3,4-tetrahydro-1-naphthyl-ethylene glycol.
2. A methyl-2,3,4-trihydroxy-1,2,3,4-tetrahydro-1-naphthyl-ethylene glycol.
3. (7-methyl-2,3,4-trihydroxy-1,2,3,4-tetrahydro-1-naphthalene)-ethylene glycol.

References Cited in the file of this patent
UNITED STATES PATENTS

| | | |
|---|---|---|
| 2,460,803 | Bonner et al. | Feb. 8, 1949 |
| 2,472,276 | Bonner et al. | June 7, 1949 |
| 2,798,098 | Linn | July 2, 1957 |

OTHER REFERENCES

Temnikova et al.: Chem. Abstracts, vol. 44 (1950), col. 4442–3 (2 pp.).